Patented Oct. 12, 1943

2,331,281

UNITED STATES PATENT OFFICE 2,331,281

TREATMENT OF MUD-LADEN DRILLING FLUIDS

Truman B. Wayne, Houston, Tex.

No Drawing. Application March 31, 1939, Serial No. 265,150

16 Claims. (Cl. 252—8.5)

This invention relates generally to the treatment of mud-laden drilling fluids, and particularly to the treatment of such fluids as are employed in the rotary drilling of oil and gas wells so as to improve the physical properties of said fluids.

The fluid employed for rotary drilling operations contains a gel-forming component and may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult.

It is an object of the present invention, generally stated, to provide a process and agent for the treatment of mud-laden drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden drilling fluid and the process of making it in which the properties of the colloidal matter in the fluid are substantially modified and rendered suitable for rotary drilling purposes.

A more specific object of this invention is to provide a process and agent for the treatment of mud-laden drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the colloidal properties of the colloidal matter in fluid. More specifically, in accordance with the present invention, the degelling action on the mud-laden or drilling fluid is produced by a class of chemical substances which may be generally described as "cation-selective synthetic resins." This may be accomplished by treatment with chemicals so selected that the resin combines chemically with or adsorbs the cations present in the aqueous phase of the mud-laden or drilling fluid with or without an accompanying base exchange. Further, the hydrated alumino-silicate or silico-aluminate complexes within the mud-laden or drilling fluid may also react with these cation selective synthetic resins and give up their basic ions or radicals, and thus produce a profound change in the nature of such complexes.

Certain base exchange reactions undoubtedly occur when a mud-laden or drilling fluid containing complex aluminum-silicon colloids are treated with ordinary alkali metal salts of boric, phosphoric, and other inorganic acids, and also when such mud complexes are subjected to the action of sodium hydroxide, sodium carbonate, and other strong alkalies. Aside from deflocculation of the mud colloids in the presence of the latter, certain decomposition and/or base exchange reactions undoubtedly occur wherein the polyvalent calcium, magnesium, iron and aluminum ions are removed from the colloidal mud complexes and precipitated as gelatinous colloids. The sodium or potassium ions which replace the above mentioned polyvalent ions in the complexes change the nature of these complexes to a considerable extent, and were it not for subsequent hydration and swelling, could produce a desirable reduction in the viscosity of the mud-laden or drilling fluids thus treated. However, due to these undesirable after-effects and reversions, treatments with alkalies are not suitable means for the reduction of viscosity except in very specific instances, and of course are not a suitable means of promoting base exchange reactions which produce a desirable and more permanent thinning effect. Metathetical base exchange reactions with salts of the alkalies are in many instances more suitable means of reducing the gel strength of mud-laden or drilling fluids, as is exemplified by the action of the sodium ortho-phosphates, sodium borates, and the like.

The present application is directed to the use of a degelling agent comprising a complex cation-selective synthetic resin which may be produced in a variety of ways but which is always characterized by its ability to selectively remove calcium, magnesium, iron and aluminum ions from their respective salts and soluble complexes. Such cation-selective synthetic resins may be water soluble or may even be water insoluble provided they are finely ground to the degree necessary for stable admixture with the fluid and solid constituents of the mud-laden or rotary drilling fluid. In either case they selectively adsorb from the mud-laden or rotary drilling fluid the polyvalent cations which are largely responsible for high viscosity effects. It is well known that polyvalent ions such as calcium or magnesium have much higher coagulating effects on colloids than do the monovalent ions such as sodium or potassium, disregarding, of course, the other effects of highly alkaline sodium and potassium compounds on the gel colloids of the mud-laden or rotary drilling fluid, as hereinabove described. Moreover, many of the natural formations which must be penetrated in the act of drilling bore holes contain large proportions of calcium and magnesium compounds which tend to greatly increase the viscosity and stickiness of the mud-laden or rotary drilling fluid. When such formations are encountered during the drilling operation, the increase in viscosity is very pronounced and considerable difficulty is experienced in the drilling operation until the viscosity is brought under proper control. Not only are the muds derived from such formations more viscous and sticky due to the proportion of complex calcium and magnesium containing aluminum-silicon complexes, but very often simpler salts of calcium and magnesium such as carbonates, bicarbonates, chlorides, sulfates, etc., are present in solution in the aqueous phase of the mud-laden or drilling fluid and tend to coagulate the colloidal content and thereby greatly increase its viscosity.

An object of the present invention is to treat mud-laden or rotary drilling fluids of unsatisfactory viscosity characteristics with the agents herein described and also to incorporate in mud-laden or rotary drilling fluids of satisfactory characteristics as a component part, a percentage of an agent which is herein described as a "cation-selective synthetic resin" which will react with or adsorb the cations from such objectionable calcium, magnesium, aluminum, or iron compounds and thus prevent an increase in viscosity when such calcium and/or magnesium bearing strata are encountered during the drilling operation.

The treating agent contemplated in the present invention may comprise one or more of many suitable cation-selective resinous bodies selected from the general class of cation-selective substances hereinafter described. Many suitable cation-selective resinous bodies have been described in chemical literature in connection with the selective removal of cations in the treatment of water. This process was described by Adams and Holmes (Jour. Soc. Chem. Ind., 54 (1935) 1-6, T., C. A. 29, No. 8, page 2620 (1935); also in French Patents Nos. 796,796, 796,797, 778,999, 778,692; British Patents 544,175, 450,179, 450,308, 450,550, 474,361; Canadian Patent No. 373,694, and other foreign and United States patents directed to the use of cation-selective resins in the treatment of water. These same reagents may be adapted to the treatment of rotary drilling fluids by adding them in dissolved or finely pulverized condition to the mud-laden or rotary drilling fluids in a manner which allows them to come in intimate contact with the constituents of the aqueous phase or the semi-soluble colloidal material containing the object ble polyvalent ions which it is desired to remove. This results in a modification of the colloidal constituents of the mud-laden or rotary drilling fluid through the removal of such salts of high coagulating properties from the aqueous phase, and through selective removal of polyvalent cations from the gel complexes.

A wide variety of agents have been proposed for the selective removal of cations from water. Among these are condensation products of phenolic bodies with aldehydes, the phenolic body preferably being a polyhydric phenol such as catechol, resorcinol, quinol, pyrogallol, phloroglucinol, and also the various commercial tannins, especially quebracho. Such polyhydric phenols are condensed with an aldehyde such as formaldehyde to prepare resins of varying solubilities ranging all the way from soluble to totally insoluble, all of which are valuable for my purpose. Of course, the soluble resins may simply be dissolved and added to the mud-laden or rotary drilling fluid whereas the insoluble resins must be finely ground prior to adding to the drilling fluid. Other types of cation-selective substances produced by the action of dehydrating agents such as sulfuric, pyrosulfuric, hydrochloric, phosphoric, and other dehydrating inorganic acids or anhydrides, as well as such salts as zinc chloride, aluminum chloride, etc., on substances which themselves contain polyhydric phenols, or which by decomposition generate polyhydric phenols or other bodies capable of resinifying into cation-selective substances, may be used. Among suitable substances are wood, wood sawdust, peat, lignite, leaves, and other organic matter. British Patent No. 450,179 described suitable processes for the preparation of such resins from the above substances. Other suitable resins are prepared from sulfited quebracho extracts which are subsequently condensed with an aldehyde such as formaldehyde. The degree of sulfitation affects the cation-selective properties of the resin as well as its solubility. More intensive sulfitation produces a more soluble resin having a higher capacity for removing the polyvalent cations. Generally, such resins are more suitable for my purpose than the insoluble resins due to the fact that they are more easily handled and can be depended upon to react with the objectionable polyvalent cations present in the drilling fluid. However, in certain instances, especially where large quantities of polyvalent metal salts are present in the aqueous phase, the insoluble resins are highly active adsorbents. Other types of complex zeolitic cation-selective bodies such as those prepared from sulfite waste liquors containing lignin bodies are also suitable. For instance, commercial sulfo-lignic acid or its sodium salt are suitable but preferably are further sulfonated to increase their zeolitic cation adsorptive properties. Lignic acid is a complex body containing unsaturated linkages and methoxy groups, and therefore polymerizes and sulfonates in the presence of sulfuric acid to produce highly desirable agents for my purpose. Resins with similar though improved properties may be prepared from cellulose sulfite liquors by reacting them with phenols and/or aldehydes, preferably in the presence of B-naphthalene sulfonic acid or other acidic condensing agents.

The water insoluble resins are preferably ground to the same fineness as commercial weighting materials and may be added to the mud-laden or drilling fluid in the same manner. If weighting materials are also used, the resin may be ground and mixed with the weighting material. Conceivably, also, if the weighting material is substantially chemically inert, as is true in the case of amorphous silica, barytes, etc., the resin could be precipitated on the weighting material and used in connection with it. Proportions of resin as high as 15 to 25 per cent of the weight of solids in the drilling fluid causes no difficulties and will maintain a fluid, stable, mud of higher solids content than is otherwise the case. If the larger proportions of finely ground resin of the hydrogen exchange type tend to make the mud acid in reaction due either to the reaction of the resin or the selective removals of cations, neutralizing and/or buffer substances may be added to the drilling fluid. Depending on the reaction and gel characteristics of the drilling fluid, these neutralizing and/or buffering agents may or may not be used when using resin of the sodium exchange type. Among suitable chemicals for this purpose are sodium orthophosphate, borax, sodium carbonate, sodium tannate, sodium acetate, sodium phthalate, and others. Various combinations of buffering agents may also be used. The cation-selective resins of the insoluble type may also be mixed with dry commercial clays, bentonites, etc., before such mud-forming materials are added to the drilling fluid. As long as such materials are dry, no reactions or adsorption occurs.

Generally, the more soluble cation-selective resins containing organically combined sulfur are the more suitable for the reason that in addition to the selective adsorption of cations, they may also act as protective colloids and dispersing agents for the clay particles.

In order to illustrate the principles of my invention, a number of specific examples are hereinafter given. However, it should be distinctly understood that I do not confine myself to the specific treating agents, drilling fluid compositions or proportions hereinafter disclosed, as it should be understood by those skilled in the art that variations from these disclosures do not depart from the principles and spirit of my invention which is directed in a general way to the use of cation-selective resinoid bodies in the degelling and controlling of the viscosity of mud-laden or rotary drilling fluids.

In the examples given the application of the reagent is illustrated in connection with a drilling fluid composed of Wyoming bentonite and water in which the bentonite is about 8% by weight of the fluid. Such a drilling fluid is useful in drilling, and as prepared has a viscosity of 48 centipoises by a Stormer viscosimeter at 600 R. P. M.

Example 1

A fluid, substantially soluble, cation-selective material may be prepared by dissolving 100 parts by weight of quebracho extract (70% tannins) in 100 parts of water, and reacting the quebracho solution with 60 parts of sodium bisulfite dissolved in 100 parts of water. The mass was boiled under reflux for eight hours to complete sulfitation of the tannin. To the sulfited tannin was added 50 parts of 40% formaldehyde solution, and the heating was continued under reflux for an additional six hours. The final product was a viscous fluid, colloidally soluble in water.

A well-drilling fluid having an initial viscosity of 48 centipoises was treated with various proportions of the cation-selective product above described. The results are shown in the Table I.

*Table I*

| Proportion of resin to drilling fluid | Viscosity in centipoises |
|---|---|
| None (original fluid) | 48 |
| 1:2000 | 38 |
| 1:1000 | 33 |
| 1:500 | 31 |

Example 2

An insoluble, non-sulfited resin was prepared by dissolving 100 parts of chestnut extract (65% tannins) in 200 parts of water, followed by adding a mixture of 100 parts of 40% formaldehyde solution and 25 parts of concentrated hydrochloric acid. Heating of the mass was continued until it became rubbery and gelatinous, after which it was removed from the flame and allowed to remain at room temperature until thoroughly hardened. It was then broken up into small pieces, washed with hot water to remove the free acid, and finally was dried at 200° C., followed by pulverizing and screening through a 300 mesh screen. The fraction passing through a 300 mesh screen was used in the treatment of a well drilling fluid as shown in Table II.

*Table II*

| Proportion of resin to drilling fluid | Viscosity in centipoises |
|---|---|
| None (original fluid) | 48 |
| 1:2000 | 35 |
| 1:1000 | 31 |
| 1:500 | 25 |

Example 3

An insoluble, non-sulfited resin was prepared by dissolving 100 parts of quebracho extract (70% tannins) in 200 parts of water, followed by the addition of a mixture of 50 parts of 40% formaldehyde solution and 25 parts of 40% caustic soda solution. The mass was heated near the boiling point under reflux for one hour. The mass became rubbery almost immediately but the heating produced some toughening of the mass. The rubbery, black resin was spread out in a thin layer to air-dry and harden, after which it was broken into small pieces, washed with water, and finally dried at 200° C. It was then pulverized and ground to pass through a 3000 mesh screen before being used in the treatment of a well drilling fluid. Results are shown in Table III.

*Table III*

| Proportion of resin to drilling fluid | Viscosity in centipoises |
|---|---|
| None (original fluid) | 48 |
| 1:2000 | 33 |
| 1:1000 | 29 |
| 1:500 | 23 |

Example 4

Resins prepared by the action of dehydrating agents on organic matter such as pulverized tree bark, leaves, dried sulfite liquor extracts, tannin extracts, peat, coal, lignite, and other organic matter are also suitable. The dehydrating agent may also be a sulfonating, halogenating, phosphorating, or other agent capable of introducing negative groups or radicals into the resin structure.

As a specific example of this species of cation-selective resin, 100 parts by weight of dry quebracho extract were thoroughly mixed with 50 parts of phosphorus pentoxide. The reaction was controlled by alternate heating and cooling until the reaction was complete while avoiding actual charring. As long as any free phosphorus pentoxide remained, a sample of the reaction product would generate heat when wetted with water. The resinification was carried to the point where the product would not give the characteristic tannin color or precipitate when added to a dilute ferric chloride solution, thus clearly distinguishing it from a simple mixture containing unreacted tannin extract or even a water soluble phosphoric acid ester of the tannin body. The mass was washed with water to remove any free phosphoric acids, dried at 200° C., and ground to pass through a 300 mesh screen.

Samples of a drilling fluid prepared largely from bentonitic material, having an initial viscosity of 48 centipoises, were treated with various proportions of the resin prepared as above described. Results are tabulated in Table IV.

*Table IV*

| Proportion of resin to drilling fluid | Viscosity in centipoises |
|---|---|
| None (original fluid) | 48 |
| 1:2000 | 29 |
| 1:1000 | 23 |
| 1:500 | 18 |

EXAMPLE 5

80 grams of Aquagel (Wyoming bentonite) containing no added cement were stirred into 920 grams of water by means of a high speed mixer until entirely homogeneous. After one hour the viscosity was measured in a Stormer viscosimeter at 600 R. P. M. To the mud so prepared were added 5.0 grams of Portland cement and stirring was continued until the mass became a solid gel. An attempt to measure its viscosity in the Stormer viscosimeter was unsuccessful, as the driving weight required was in excess of 400 grams. To the solid gel were added 2.5 grams of the cation-selective agent described in Example 4 and stirring was done with a spatula until the gel had liquefied sufficiently to allow use of the high speed mixer. After stirring five minutes, the viscosity of the treated mass was measured in a Stormer viscosimeter at 600 R. P. M. The data are recorded in Table V.

*Table V*

| | Sample | Viscosity in centipoises |
|---|---|---|
| 1 | Original Aquagel suspension | 39 |
| 2 | (1) after adding 5.0 grams Portland cement | 1 100+ |
| 3 | (2) plus 2.5 grams resin from Example 4 | 27 |

1 In excess of 400 grams driving weight.

EXAMPLE 6

80 grams of Aquagel were mixed with 2.5 grams of 300 mesh resin prepared according to Example 4 and stirred into 920 grams of water in a high speed mixer. After one hour the viscosity was measured in a Stormer viscosimeter at 600 R. P. M. To the fluid mud so prepared were added 5.0 grams of Portland cement and the stirring was continued in the high speed mixer until the fluid appeared to have attained a constant viscosity. The viscosity was again measured in a Stormer viscosimeter at 600 R. P. M. The data are recorded in Table VI.

*Table VI*

| | Sample | Viscosity in centipoises |
|---|---|---|
| 1 | Aquagel suspension containing 2.5 grams resin | 17 |
| 2 | (1) plus 5.0 grams Portland cement | 25 |

It is readily apparent from Examples 5 and 6 that the cation-selective material prevented the cement from materially increasing the viscosity of the drilling fluid contaminated by it; and that after contamination by cement, the cation-selective material greatly reduces the viscosity of cement-contaminated drilling fluids. Example 6 also illustrates that dry Aquagel, or other dry mud base whose gel strength is affected by alkali-earth and/or alkaline-earth metal cations present in the fluid, may be mixed with a small proportion of a cation-selective material. The dry mixture, when added to water, produces stable suspensions of lower viscosity than are obtainable from the usual Aquagel and water suspensions. Conversely, fluid Aquagel suspensions of higher total solids content may be conveniently prepared from such admixtures due to the degelling influence of the cation-selective material.

EXAMPLE 7

Another embodiment of my invention is exemplified in the preparation of weighted drilling fluids comprising a colloidal gel-forming material and a finely divided weighting material such as barytes.

A colloidal suspension was prepared from 80 grams of Aquagel (Wyoming bentonite) and 920 grams of water. The viscosity was measured in a Stormer viscosimeter at 600 R. P. M.

To 400 grams of the Aquagel suspension were added 210 grams of barytes (free of bentonite and degelling chemical). Stirring was continued in a high speed mixer until thoroughly homogeneous. The viscosity was measured in a Stormer viscosimeter at 600 R. P. M.

To a second 400-gram portion of the Aquagel suspension were added 212 grams of a mixture of 210 grams of barytes and 2.0 grams of the cation-selective resin described in Example 4. Stirring was continued in a high speed mixer until thoroughly homogeneous. The viscosity was determined in the manner previously described.

The data are recorded in Table VII.

*Table VII*

| | Sample | Viscosity in centipoises |
|---|---|---|
| 1 | Original 8% Aquagel suspension | 39 |
| 2 | Aquagel suspension plus barytes | 63 |
| 3 | Same as (2) plus 2.0 grams of resin (Example 4) | 45 |

In general, it may be stated that the reduction in viscosity which may be expected from the treatment of any drilling fluid with cation-selective materials is largely determined by the influence which alkali-earth or alkaline-earth metal cations have had in determining its viscosity characteristics. This is amply illustrated in the preceding Examples 5 to 7, inclusively.

The above examples illustrate a variety of resins which are suitable for my purpose. Others which conform to the generic descriptive terms "zeolitic cation-selective synthetic resin," "carbonaceous zeolites," "hydrogen zeolites," and the like which are used in water conditioning are likewise suitable. Furthermore, these cation-selective materials need not be added to the prepared mud, as shown in the above examples, but may be mixed in the dry state with the mud-making materials or weighting materials used in compounding either natural or synthetic mud-laden fluids. Proportions up to twenty-five per cent or even higher, based on the weight or volume of the dry mud compounding or weighting materials, may be used. If the hydrogen-exchange type of material is used, it may be necessary, at the higher concentrations, to add a neutralizing or buffer material to maintain the pH of the drilling fluid so compounded within desirable limits. Synthetic mud admixtures of high specific gravity and excellent wall building characteristics may be so prepared. The lower water content and the tightly bound condition of such water makes such drilling fluids of value in combating the heaving shales often encountered in well drilling operations.

The term "zeolitic cation-selective organic resinous body" used in the following claims is intended to include the various types of cation-selective resins, carbonaceous zeolites, and organic base exchange substances described in the foregoing specification. It does not include well defined chemical salts which may undergo base exchange reactions by metathesis, such as the sodium orthophosphates.

While in the foregoing, theories are advanced, these have been put forward to facilitate the understanding of the objects and purposes of this invention; it is to be understood, however, that this invention is not dependent upon or limited to any theory put forward. What is claimed is:

1. A well drilling fluid material comprising a water dispersible mud-forming base and a zeolitic cation-selective organic resinous body of the character described.

2. A well drilling fluid material comprising a water dispersible mud-forming base of high specific gravity and a zeolitic cation-selective organic resinous body of the character described.

3. A well drilling fluid material comprising a finely divided insoluble water-dispersible mud-forming base of high specific gravity and a finely divided zeolitic cation-selective organic resinous body of the character described.

4. A mud-forming well drilling fluid material comprising a water-dispersible gel-forming base and a zeolitic cation-selective organic resinous body of the character described.

5. An aqueous mud-laden drilling fluid for wells containing a zeolitic cation-selective organic resinous body of the character described.

6. An aqueous mud-laden drilling fluid for wells containing from 0.02 to 15 per cent of a zeolitic cation-selective organic resinous body of the character described.

7. The process of treating aqueous mud-laden well drilling fluids comprising adding thereto a zeolitic cation-selective organic resinous body of the character described.

8. The process of treating aqueous mud-laden well drilling fluids comprising adding thereto from 0.02 to 15 per cent of a zeolitic cation-selective organic resinous body of the character described.

9. The process of treating aqueous mud-laden well drilling fluids comprising adding thereto a water-soluble zeolitic cation-selective organic resinous body of the character described.

10. The process of treating aqueous mud-laden well-drilling fluids comprising adding thereto a finely divided water-insoluble zeolitic cation-selective organic resinous body of the character described.

11. The process of treating aqueous mud-laden well-drilling fluids comprising adding thereto a zeolitic cation-selective condensation product of a phenolic body and an aldehyde.

12. The process of treating aqueous mud-laden well-drilling fluids comprising adding thereto a zeolitic cation-selective condensation product of a tannin body and an aldehyde.

13. The process of treating aqueous mud-laden well-drilling fluids comprising adding thereto a zeolitic-cation-selective condensation product of a tannin body and a phosphorus anhyride.

14. An aqueous mud-laden drilling fluid for wells containing a zeolitic cation-selective condensation product of a phenolic body and an aldehyde.

15. An aqueous mud-laden drilling fluid for wells containing a zeolitic cation-selective condensation product of a tannin body and an aldehyde.

16. An aqueous mud-laden drilling fluid for wells containing a zeolitic cation-selective condensation product of a tannin body and a phosphorus anhydride.

TRUMAN B. WAYNE.

---

CERTIFICATE OF CORRECTION.

Patent No. 2,331,281.   October 12, 1943.

TRUMAN B. WAYNE.

It is hereby certified that error appears in the printed specification of the above numbered patent requiring correction as follows: Page 3, second column, line 60, Example 3, for "3000" read --300--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.

CERTIFICATE OF CORRECTION.

Patent No. 2,331,281. October 12, 1943.

TRUMAN B. WAYNE.

It is hereby certified that error appears in the printed specification of the above numbered patent requiring correction as follows: Page 3, second column, line 60, Example 3, for "3000" read --300--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.